US006217166B1

(12) United States Patent
Saito et al.

(10) Patent No.: US 6,217,166 B1
(45) Date of Patent: Apr. 17, 2001

(54) INK JET RECORDING METHOD

(75) Inventors: Yoichi Saito; Masaru Tsuchiya; Yoshihiro Mochizuki, all of Hino (JP)

(73) Assignee: Konica Corporation, Tokyo (JP)

(*) Notice: Subject to any disclaimer, the term of this patent is extended or adjusted under 35 U.S.C. 154(b) by 0 days.

(21) Appl. No.: 09/104,706

(22) Filed: Jun. 25, 1998

(30) Foreign Application Priority Data

Jul. 1, 1997 (JP) .................................................. 9-188926

(51) Int. Cl.[7] .................................................... G01D 11/00

(52) U.S. Cl. ......................... 347/100; 347/106; 428/195; 106/31.58

(58) Field of Search ............................ 347/100, 60, 106; 428/195; 106/31.58, 31.86

(56) References Cited

U.S. PATENT DOCUMENTS

| | | | | |
|---|---|---|---|---|
| 4,592,951 | * | 6/1986 | Viola | 428/323 |
| 4,783,376 | * | 11/1988 | Sakaki et al. | 428/511 |
| 4,877,686 | | 10/1989 | Riou et al. . | |
| 5,141,797 | * | 8/1992 | Wheeler | 428/195 |
| 5,662,997 | * | 9/1997 | Onishi et al. | 428/331 |
| 5,908,723 | * | 6/1999 | Malhotra et al. | 430/31 |
| 6,066,387 | * | 5/2000 | Ueda et al. | 428/212 |
| 6,076,919 | * | 6/2000 | Shirota et al. | 347/60 |

FOREIGN PATENT DOCUMENTS

| | | |
|---|---|---|
| 0 246 987 A1 | 11/1987 | (EP) . |
| 0 493 100 A1 | 7/1992 | (EP) . |
| 0 582 466 A1 | 2/1994 | (EP) . |
| 0 634 286 A1 | 1/1995 | (EP) . |

* cited by examiner

*Primary Examiner*—John Barlow
*Assistant Examiner*—M. Shah
(74) *Attorney, Agent, or Firm*—Frishauf, Holtz, Goodman, Langer & Chick, P.C.

(57) ABSTRACT

An ink-jet recording method is disclosed, including recording on an ink-jet recording sheet containing a non-water-absorbing support and provided thereon an ink absorbing layer containing polyvinyl alcohol, fine inorganic particles and boric acid or its salt, using an ink-jet recording apparatus and a water-based recording liquid containing a high boiling solvent compound having a hydroxy group, wherein the amount of boric acid or its salt contained in the ink absorbing layer of the recording sheet (X), the amount of a hydroxy group contained in polyvinyl alcohol contained in the ink absorbing layer of the recording sheet (Y) and the maximum amount of the the hydroxy group contained in the high boiling solvent contained in a unit area when recorded on the recording sheet at a maximum ejecting amount of the water-based recording liquid (Z) satisfy the following requirements:

$$0.05 \leqq X/Y \leqq 0.5 \quad (1)$$

$$Z/Y \leqq 4. \quad (2)$$

10 Claims, No Drawings

INK JET RECORDING METHOD

FIELD OF THE INVENTION

The present invention is related to an ink-jet recording method of recording on an ink-jet recording sheet by use of a water-based ink and in particular to an ink-jet recording method by use of an ink-jet recording sheet having a void-type ink absorbing layer with high ink-absorptivity and little deterioration of the layer after printing.

BACKGROUND OF THE INVENTION

Ink-jet recording is recording of images or letters through ejecting fine ink droplets based on various operating principles and allowing them to be adhered onto a recording sheet, giving advantages such as relatively high speed printing, low noise and being readily accessible to multi-color printing. This system has overcome problems such as ink clogging of nozzles and maintenance in view of both inks and apparatuses, and has spread widely in the field of printers, facsimiles and computer end-items. Details thereof are described in "Trends in Ink-Jet Recording Techniques" (edited by Takaichi Nakamura and published by Nihon Kagakujoho Corp., Mar. 31, 1995).

Employed as an ink-jet recording sheet are a variety of recording sheets, including plain paper, various types of coated paper provided with a layer comprising a hydrophilic binder and an inorganic pigment (e.g., art paper, coated paper, cast-coated paper, etc.), various paper laminated, on both sides, with plastic resin, and transparent or opaque plastic resin film supports having thereon an ink-absorbing layer as a recording layer.

The ink-absorbing layer described above is classified into a swelling type, one mainly comprised of a hydrophilic binder and a void-type, having internal voids.

The void-type ink absorbing layer holds the ink within the voids formed in the layer, and the voids can be formed by allowing various inorganic solid particles or organic solid particles to be contained in the layer.

Ink-jet recording sheets requires high performance such that printing dots have a high density, exhibit light, vivid image color, and absorb ink so quickly that the ink does not flow or penetrate even when the printing dots overlap, and lateral diffusion of the printing dots is not excessive so that peripheries of the dots are smooth and not blurred. In cases where the ink absorbing speed of the layer is low, when two or more different colored ink droplets overlap, the droplets cause repellency on the recording sheet or penetration in the boundary region of different colors, leading to a deteriorated image quality, necessitating that the ink-jet recording sheet requires high ink absorptivity.

To overcome these problems, there have been proposed a number of techniques; for example, JP-A 52-53012 (hereinafter, the term, JP-A means unexamined, published Japanese Patent Application) discloses a recording sheet comprising low-sizing raw paper coated with a paint for surface treatment; JP-A 55-5830 discloses a recording sheet comprising a support coated with an ink absorbing layer; JP-A 56-157 discloses a recording sheet containing, as pigment, non-colloidal silica powder in a coating layer; JP-A 57-107878 discloses a recording sheet employing an inorganic pigment and an organic pigment in combination; JP-A 58-110287 discloses a recording sheet having void distribution with two peaks; JP-A 62-111782 discloses a recording sheet comprising two upper and lower porous layers; JP-A 59-68292, 59-123696 and 60-135786 disclose a recording sheet having amorphous cracking; JP-A 61-135786, 61-148092 and 62-149475 disclose a recording sheet having a fine powder layer; JP-A 63-252779, 1-108083, 2-136279, 3-65376 and 3-27976 disclose a recording sheet containing a pigment or fine silica particles with specified physical property parameters; JP-A 57-14091, 60-219083, 60-210984, 61-20797, 61-188183, 5-278324, 6-92011, 6-183134, 7-137431 and 7-276789 disclose a recording sheet containing fine silica particles, such as colloidal silica; JP-A 2-276671, 3-67684, 3-215082, 3-251488, 4-67986, 4-263983 and 5-16517 disclose a recording sheet containing hydrated alumina fine particles.

In cases where a support itself is water absorptive, the ink-jet recording sheet exhibits high absorbing volume and ink absorptivity, which are preferable in terms of ink absorption. However, disadvantages result such that after ink-jet recording, the support becomes wavy, wrinkling occurs on images or a part of the dyes penetrates into the support, which lowers the density.

In cases where the support is water-nonadsorptive, on the other hand, the above disadvantages were not produced and vivid images with high density were obtained. However, there was still a problem such that the total amount of ink absorbing voids formed in the ink absorbing layer were limited. In the case of an ink absorbing layer with a dry thickness of 40 μm, when solid component(s) are presumed to form a layer with a thickness of 22 μm, the total volume of the voids is to be only 18 ml per $m^2$ of the ink-jet recording sheet, producing problems such that, though depending on the recording system, the volume of the voids for absorbing the ink becomes insufficient in the vicinity of the maximum ink quantity. Although an increase of a coating layer thickness enhances the void volume, such layers become brittle, resulting in cracking at low humidity or lowering adhesion onto the support.

To solve the problems described above, the Applicants of the present invention proposed a method of improving the layer-forming properties and brittleness of the layer through incorporating a hydrophilic binder capable of forming a void structure and a hardening agent (Japanese Patent Application No. 8-283636). A void-type ink-jet recording sheet in which a void-type ink absorbing layer is formed using polyvinyl alcohol as a binder and boric acid or its salt as a hardening agent is the specifically preferred one. However, when recorded on the ink-jet recording sheet containing polyvinyl alcohol as a hydrophilic binder and boric acid or its salt as a hardening agent by using a water-based ink containing as a high boiling solvent, a compound containing a hydroxy group, it was proved that other problems were produced such as partial cracking occurring in the layer during high temperature and high humidity storage of the recorded sheet.

As a result of a study of the causes, it was proved that the layer was deteriorated due to the action of a hydroxy group containing compound which was incorporated in the water-based recording ink. Furthermore, taking account of the fact that when the content of fine inorganic particles used for forming voids is less than 2, based on the weight of polyvinyl alcohol, cracking hardly occurs, it is contemplated that the use of the fine inorganic particles in large amounts used to form the voids, lowers layer forming ability of polyvinyl alcohol in printing portions.

SUMMARY OF THE INVENTION

In view of the foregoing, it is an object of the present invention to provide a method of ink-jet recording on an ink-jet recording sheet having an ink absorbing layer containing polyvinyl alcohol as a hydrophilic binder and boric acid or its salt as a hardening agent with a water-based recording liquid containing a compound having a hydroxy group as a high boiling solvent, in which no cracking is produced even when recorded sheets are stored at high temperature and high humidity.

The above object can be accomplished by an ink-jet recording method comprising recording on an ink-jet recording sheet comprising a non-water-absorbing support and provided thereon an ink absorbing layer containing polyvinyl alcohol, fine inorganic particles and boric acid or its salt, using an ink-jet recording apparatus and a water-based recording liquid containing a compound having a hydroxy group as a high boiling solvent, and the following requirements (1) and (2) being met:

$$0.05 \leqq X/Y \leqq 0.5 \quad (1)$$

$$Z/Y \leqq 4 \quad (2)$$

wherein X is the amount of boric acid or its salt contained in the ink absorbing layer of the recording sheet, per unit area (mmol/m$^2$); Y is the amount of a hydroxy group contained in polyvinyl alcohol contained in the ink absorbing layer of the recording sheet, per unit area (mmol/m$^2$); and when recorded on the recording sheet at a maximum ejecting amount of the water-based recording liquid, Z is a maximum amount (mmol/m$^2$) of the the hydroxy group contained in the high boiling solvent contained in a unit area, when recorded on the recording sheet at a maximum ejecting amount of the water-based recording liquid, expressed in mmol/m$^2$.

DETAILED DESCRIPTION OF THE INVENTION

The ink-jet recording sheet used in the present invention has a void-type ink absorbing layer (hereinafter, also referred to as a void layer), provided on a non-water-absorbing support. In the void layer according to the invention, polyvinyl alcohol is used as a hydrophilic binder, in terms of the high void ratio being obtainable. Interaction between polyvinyl alcohol and fine inorganic particles easily forms soft aggregations, leading to efficient void formation.

Polyvinyl alcohols used in the invention also include a cation-modified polyvinyl alcohol, a anion-modified polyvinyl alcohol and an anion-modified polyvinyl alcohol. The average polymerization degree of the polyvinyl alcohol used in invention is preferably 1,000 to 5,000, and more preferably 2,000 or more (still more preferably 2,000 to 5,000), in terms of improvements in layer forming property. A saponification degree is preferably 70 to 100% and more preferably 80 to 100%.

The cation-modified polyvinyl alcohol is referred to as a polyvinyl alcohol containing a primary, secondary or tertiary amino group, or a quaternary ammonium group in the main chain or side chain of the polyvinyl alcohol, as described in JP-A 61-10483, which can be obtained through saponification of a copolymer of a cationic group-containing ethylenic unsaturated monomer and vinyl acetate. Examples of the cationic group-containing ethylenic unsaturated monomer include trimethyl-(2-acrylamido-2,2-dimethylethyl) ammonium chloride, trimethyl-(3-acrylamido-3,3-dimethylpropyl)ammonium chloride, N-vinyl imidazole, N-vinyl-2-methylimidazole, N-(3-dimethylaminopropyl) methacylamide, hydroxyethyltrimethylammonium chloride, trimethyl-(methacrylamidopropyl)ammonium chloride and N-(1,1-dimethyl-3-dimethylaminopropyl)acrylamide. In the copolymer of the cationic group-containing ethylenic unsaturated monomer and vinyl acetate, the content of the cation group-containing monomer is preferably 0.1 to 10 mol %, and more preferably 0.2 to 5 mol %, based on vinyl acetate.

The anion-modified polyvinyl alcohol includes, for example, a polyvinyl alcohol containing an anionic group, as described in JP-A 1-206088; a copolymer of vinyl alcohol and a vinyl compound containing a water-solubilizing group, as described in JP-A 61-237681 and 63-307979; and a modified polyvinyl alcohol containing a water-solubilizing group, as described in 7-285265.

The nonion-modified polyvinyl alcohol includes, for example, a polyvinyl alcohol derivative in which a polyalkyleneoxide group is added to a part of the polyvinyl alcohol, as described in JP-A 7-9758; and a block copolymer of a vinyl compound containing a hydrophobic group and vinyl alcohol, as described in JP-A 8-25795.

Other hydrophilic binder may be incorporated into the void layer, together with polyvinyl alcohol. Examples of other hydrophilic binder used in combination with polyvinyl alcohol include gelatin such as acid processed gelatin or alkali processed gelatin; gelatin derivatives such as phenyl carbamoyl-modified gelatin and phthalated gelatin; polyvinyl pyrrolidone; polyethyleneoxide; carboxymethylcellulose; hydroxyethylcellulose; polyacrylamide, pullulan; polyacrylic acid, casein, agar, caraginan and dextran. The hydrophilic binder used in combination with polyvinyl alcohol is incorporated preferably in an amount of not more than 20% by weight, based on polyvinyl alcohol.

In the invention, the fine inorganic particles are used to form voids in the ink absorbing layer. Examples of the fine inorganic particles include inorganic white pigments, such as precipitated calcium carbonate light, calcium carbonate heavy, magnesium carbonate, kaoline, clay, talc, calcium sulfate, barium sulfate, titanium dioxide, zinc oxide, zinc hydroxide, zinc sulfide, zinc carbonate, hydrotalcite, aluminum silicate, diatomite, calcium silicate, magnesium silicate, synthetic amorphous silica, colloidal silica, alumina, colloidal alumina, pseudo-boehmite, aluminum hydroxide, lithopone, zeolite and magnesium hydroxide.

As the fine inorganic particles preferably used, are those selected from fine silica particles prepared by a gas phase method and colloidal silica, and more preferably fine silica particles prepared in a gas-phase method, in terms of a image density, image vividness and manufacturing costs. The fine silica particles prepared in the gas-phase method, which can be obtained by subjecting silicon tetrachloride, together with hydrogen and oxygen, to combustion at a high temperature, are conventionally silica powder having an average primary particle size of 5 to 500 nm. The colloidal silica preferably used in the invention, which can be obtained through double decomposition of sodium silicate with acid or by heat-ripening silica gel which has been allowed to pass through an ion-exchange resin layer, are conventionally those having an average particle size of 5 to 100 nm. The use of the colloidal silica in the ink-jet recording is described in JP-A 57-14091, 60-219083, 60-219084, 61-20792, 61-188183, 63-17807, 4-93284, 5-278324, 6-92011, 6-183134, 6-297830, 7-81214, 7-101142, 7-179029 and 7-137431; and International Patent open to public inspection, WO94/26530. The surface of the fine silica particles prepared in the gas-phase method or the colloidal silica may be modified with cations, for example, inorganic salts such as Al, Ca, Mg and Ba.

The fine inorganic particles used in the invention may be dispersed uniformly in the form of primary particles as they are, or in the form of secondary coagulated particles. The use of the fine inorganic particles having an average primary particle size of 30 nm or less is preferable in terms of glossiness. The use of the fine inorganic particles having an average primary particle size of 30 nm or less prevents coagulation which is liable to be caused when used in combination with a cation type aqueous soluble polymeric mordant, leading to enhanced glossiness. The use of the fine inorganic particles having an average primary particle size of 20 nm or less is more preferable. The lower limit of the primary particle size is not limited, but preferably 3 nm or more, and more preferably 6 nm or more, in terms of manufacture of particles.

The average size of fine inorganic particles can be determined by observing particles themselves or those appeared in the void layer or on its surface by an electron microscope, measuring sizes of 100 particles arbitrarily chosen and averaging them as a simple average (number average). The size of each particle is represented as a diameter of a circle equivalent to a projected area of the particle.

In one preferred embodiment, the fine silica particles prepared in the gas-phase method are preferably those having an average primary particle size of 30 nm or less in terms of glossiness. The fine silica particles prepared by the gas-phase method are commercially available, such as various kinds of Aerogil available from Nihon Aerogil Corp. In another preferred embodiment, the colloidal silica is preferably one having an average particle size of 7–30 nm, in terms of glossiness.

The fine inorganic particles are incorporated preferably in a ratio by weight of 2 to 10, and more preferably 3 to 9, based on polyvinyl alcohol.

Boric acid or its salt is used as a hardening agent. Boric acid or its salt (hereinafter, also referred to as a hardening agent) is an oxyacid containing a boron atom as a central atom or its salt; and examples thereof include orthoboric acid, metaboric acid, hypoboric acid, tetraboric acid, pentaboric acid, and their salts.

The hardening agent may be added into a coating solution to form the void layer or a coating solution to form another layer adjacent to the void layer. Alternatively, the hardening agent can be supplied into the void layer in a manner such that a coating solution previously containing a hardening agent is coated on a support and further thereon is coated a coating solution to form a void layer, containing no hardening agent, or a coating solution to form a void layer, containing no hardening agent is coated, dried and then a solution containing a hardening agent is further coated thereon. It is preferable to add the hardening agent into the coating solution to form the void layer or into the coating solution to form an layer adjacent to the void layer, in terms of ease in manufacture.

Next, the following requirements to be met in the invention (1) and (2) will be described below:

$$0.05 \leq X/Y \leq 0.5 \quad (1)$$

$$Z/Y \leq 4 \quad (2)$$

wherein X is the amount of boric acid or its salt contained in the ink absorbing layer of the recording sheet, per unit area (expressed in terms of mmol/$m^2$); Y is the amount of a hydroxy group contained in polyvinyl alcohol contained in the in the ink absorbing layer of the recording sheet, per unit area (expressed in terms of mmol/$m^2$); and when recorded on the recording sheet at the maximum ejecting amount of the water-based recording liquid (i.e., the maximum ink amount), Z is a maximum value (mmol/$m^2$) among the amounts of the hydroxy group contained in the high boiling solvent contained in a unit area.

To obtain effects of the present invention, three parameters, i.e., the amount of boric acid or its salt per unit area (mmol/$m^2$), which is contained in the ink absorbing layer of the recording sheet; the amount of a hydroxy group per unit area (mmol/$m^2$), which is contained in polyvinyl alcohol contained in the in the ink absorbing layer of the recording sheet; and a maximum value (mmol/$m^2$) among the amounts of the hydroxy group contained in the high boiling solvent contained in a unit area, when recorded on a recording sheet at the maximum ejecting amount of the water-based recording liquid, are required to concurrently satisfy the above conditions (1) and (2). As a result, cracking occurred on the layer surface during storage under conditions of high temperature and high humidity, can be minimized.

Requirement (1) indicates that the ratio of the amount of boric acid or its salt to the content of the hydroxy group of polyvinyl alcohol needs to be within a specified range, requirement (2) indicating that the ratio of the maximum value among the contents of the hydroxy group of the high boiling solvent contained in a unit area in recording on the recording sheet at a maximum ejecting amount of the water-based recording liquid to the content of the hydroxy group of polyvinyl alcohol needs to be within a specified range.

Although the reason that both requirements (1) and (2) must be satisfied is not clarified, it is contemplated that a hardening agent needs to be present in an optimal ratio with respect to the content of a hydroxy group of polyvinyl alcohol and that since the hydroxy group of the high boiling solvent contained in the water-based recording liquid and the hydroxy group of polyvinyl alcohol competitively react with the hardening agent, the ratio of the hydroxy group content of the high boiling solvent contained in the water-based recording liquid to that of polyvinyl alcohol is critical in order to maintain chemical reaction of the hardening agent with polyvinyl alcohol.

Next, X, Y and Z will be further detailed below.

X represents the amount of boric acid or its salt contained in the ink absorbing-layer of the recording sheet, per unit area (expressed in terms of mmol/$m^2$). Thus, when boric acid or its salt contains n boron atom(s) within the molecule, X is n times the mole number of the boric acid or its salt. For example, in the case when orthoboric acid ($H_3BO_3$) or its salt, or metaboric acid ($HBO_2$) or its salt is contained in an amount of 0.01 mol per m2 of a recording sheet, X is to be 0.01 (mol/$m^2$), that is, 10 (mmol/$m^2$). In the case when a tetraborate (e.g., $Na_2B_4O_7$) is contained in an amount of 0.01 mol per $m^2$ of a recording sheet, X is to be 4×0.01 (mol/$m^2$), that is, 40 (mmol/$m^2$). In the case when a pentaborate (e.g., $NaB_5O_8$) is contained in an amount of 0.01 mol per $m^2$ of a recording sheet, X is to be 5×0.01 (mol/$m^2$), that is, 50 (mmol/$m^2$). In cases where a boric acid and its salt are used in combination, a X for each is calculated and the sum thereof is the total X.

Using an apparent molecular weight of polyvinyl alcohol (=86−0.42xp), where p is the saponification degree (in %), the molecular weight of vinyl acetate is 86 and the molecular weight of vinyl alcohol is 44, and when the amount of polyvinyl alcohol is y g per $m^2$ of a recording sheet, Y is represented as follows:

$$Y=(1000xy)\times(p/100)/(86-0.42xp)=10xpxy/(86-0.42xp)$$

For example, when a polyvinyl alcohol with a saponification degree of 88% is used in an amount of 3 g/m2, $$Y=10\times88\times3/(86-0.42\times88)=53.8\ (\text{mmol/m}^2).$$

Z is a maximum value, expressed in mmol/$m^2$, of the amounts of the hydroxy group contained in a high boiling organic solvent contained in a unit area of a recording sheet when recorded on the recording sheet at the maximum ejecting amount of the water-based recording liquid. The amount of the hydroxy group contained in a high boiling organic solvent contained in a unit area of a recording sheet when recorded on the recording sheet at the maximum ejecting amount of the water-based recording liquid refers to the amount of hydroxy group of a high boiling organic solvent contained in a water-based recording liquid on a unit area of a recording sheet when printed at the maximum ejecting amount so as to form a solid image, by an ink-jet recording apparatus controlled according to a printer driver software. The high boiling organic solvent is referred to as an organic solvent having a boiling point of 120° C. or higher, containing no organic solvent having a boiling point lower than 120° C.

In color ink-jet recording, yellow, magenta and cyan inks, and, if necessary, a black ink, are generally used in combination thereof, as a water-based recording liquid. In some cases, plural inks different in dye density for each color are used. In this case, when printed so as to form a solid image at the maximum ejecting amount in various combinations of inks, using an ink-jet recording apparatus based ono printer driver software, the amount of the hydroxy group of a high boiling organic solvent contained in a water-based recording liquid on a unit area of a recording sheet is obtained for each of the inks in combination. Among these amounts of the hydroxy group obtained, the maximum is the maximum amount of the hydroxy group contained in a high boiling organic solvent contained in a unit area when recorded on a recording sheet at the maximum ejecting amount of the water-based recording liquid.

In the case when three kinds of inks having the following compositions are used, Z can be determined as follows.

TABLE 1

| | Y ink | M ink | C ink |
|---|---|---|---|
| Dye | 2.1 g | 1.7 g | 1.9 g |
| DEG | 12.0 g | 8.0 g | 6.8 g |
| GLY | 9.0 g | 12.0 g | 15.0 g |
| Water to make | 100 ml | 100 ml | 100 ml |
| Amt. of OH group (mmol/100 ml) | 519 | 542 | 617 |

DEG: Diethylene glycol ($HOCH_2CH_2OCH_2CH_2OH$)
Molecular weight=106,
Amount of hydroxy group=2/mol
(Molecular weight per one hydroxy group;106/2)

GLY: Glycerin [$CH_2OHCH(OH)CH_2OH$]
Molecular weight=92,
Amount of hydroxy group=3/mol
(Molecular weight per one hydroxy group;92/3)

In the Table, the amount of a hydroxy group contained in a high boiling organic solvent in 100 ml of each ink is as follows:

Y ink;
Hydroxy group amount of DEG=(1000×12.0)÷(106/2)=226 mmol
Hydroxy group amount of GLY=(1000×9.0)÷(92/3)=293 mmol
Total hydroxy group amount contained in a high boiling organic solvent per 100 ml of Y ink=226+293=519 mmol M ink;
Hydroxy group amount of DEG=(1000×8.0)÷(106/2)=151 mmol
Hydroxy group amount of GLY=(1000×12.0)÷(92/3)=391 mmol
Total hydroxy group amount contained in a high boiling organic solvent per 100 ml of M ink=151+391=542 mmol C ink;
Hydroxy group amount of DEG=(1000×6.8)÷(106/2)=128 mmol
Hydroxy group amount of GLY=(1000×15.0)÷(92/3)=489 mmol
Total hydroxy group amount contained in a high boiling organic solvent per 100 ml of C-ink=128+489=617 mmol.

Assuming that an ink-jet printer records according to a printer driver software under the following printing conditions [1], [2] and [3]:

[1] Y, M and C inks each are singly printed at the maximum ink ejecting amount of 25 ml per $m^2$ of a recording sheet to form a solid image,

[2] two inks are printed and superposed to form a solid image, provided that each ink is printed at a 50% of the single printing condition described above,

[3] three inks are printed and superposed to form a solid image, provided that each ink is printed at a 35% of the single printing condition described above, the hydroxy group amount per $m^2$ of single color, a two color or a three color image is as follows:

(1) Single colored solid image (max. ink amount=25 ml/$m^2$)
Y: 524×(25/100)=131 mmol
M: 542×(25/100)=136 mmol
C: 617×(25/100)=154 mmol (2) Two colored solid image (max. ink amount=25 ml/$m^2$)
Y+M: 0.5×(524+542)×(25/100)=133 mmol
M+C: 0.5×(542+617)×(25/100)=145 mmol
C+Y: 0.5×(617+524)×(25/100)=143 mmol (3) Three colored solid image (max. ink amount=26.25 ml/$m^2$)
0.35×(524+542+617)×(25/100)=147 mmol As can be seen from (1), (2) and (3) described above, when the C-ink is singly printed to form a solid image, the hydroxy group amount becomes a maximum value, that is, the maximum amount of the hydroxy group contained in the high boiling organic solvent in the water-based recording liquid is 154 mmol and accordingly, Z is 154 mmol/$m^2$.

In the present invention, X, Y and Z more preferably meet the following requirements:

$$0.1 \leqq X/Y \leqq 0.4 \quad (1)$$

$$Z/Y \leqq 3. \quad (2)$$

A variety of adjuvants may be added to the ink absorbing layer according to the present invention.

Specifically, a cationic mordant is preferred in terms of enhancing water proof or moisture resistance after printing.

Examples of the cationic mordant include polymeric mordant containing a primary, secondary or tertiary amino group or a quaternary ammonium base. Of these a polymeric mordant containing a quaternary ammonium base, is preferred due to minimal decoloring during storage, reduced deterioration in light fastness and high mordanting ability. Preferred examples of the polymeric mordant include a homopolymer of a monomer containing the quaternary ammonium base or its copolymer or a condensation polymer with another monomer.

Besides the cationic mordant, the ink absorbing layer of the ink-jet recording sheet used in the invention may further contain a variety of adjuvants known in the art, including a UV absorbent described in JP-A 57-74193, 57-87988 and 620261476; an antifading agent described in JP-A57-74192, 57-87989, 60-72785, 61-146591, 1-95091 and 3-13376; a surfactant such as an anionic surfactant, cationic surfactant or nonionic surfactant described in 59-42993, 59-52689, 62-280069, 61-242871 and 4-219266; a fluorescent brightening agent, a defoaming agent, an antimolding agent, a thickening agent, an antistatic agent and a matting agent.

The ink-jet recording sheet used in the invention may have two or more ink absorbing layers on one side of a support. In cases where plural ink absorbing layers are provided, at least one layer is an ink absorbing layer according to the invention, and other layer(s) may be a swelling layer mainly containing a hydrophilic binder such as gelatin or an ink absorbing layer according to the invention.

On the other side opposite to ink absorbing layer, various backing layers may be provided for anticurling, to prevent adhesion when overlapped immediately after printing or to prevent an ink from being transferred to another ink-jet recording sheet. In the backing layer, a hydrophilic binder or a hydrophobic binder is general employed, depending on the kind or thickness of the support, or constitution or thickness of the ink absorbing layer. The thickness of the backing layer is preferably 0.1 to 10 $\mu$m. The surface of the backing layer may be roughened for the purpose of preventing adhesion with another recording sheet, improving writability or improving transportability within an ink-jet recording apparatus. Fine organic or inorganic particles at sizes of 2 to 20 $\mu$m are employed for roughening.

Non-water-absorbing supports used in the ink-jet recording sheet according to the invention include those used in conventional ink-jet recording sheets known in the art. Examples thereof include a transparent film comprised of a material, such as a polyester resin, a diacetate resin, a triacetate resin, an acryl resin, a polycarbonate resin, a polyvinyl chloride resin, polyimide resin, cellophane, or celluloid; a resin-coated paper having, on at least one side of a base paper, a coating layer comprised of polyolefin resin containing a white pigment (so-called RC paper); and a semitransparent or opaque support, so-called white PET in which a white pigment is added into polyethylene terephthalate.

Prior to coating the ink absorbing layer, the support is preferably subjected to corona discharge or subbing treatment for the purpose of enhancing adhesion strength between the support and the ink absorbing layer. The ink-jet recording sheet according to the invention is not necessarily colorless and transparent, or white; a colored recording sheet may be employed.

An ink-jet recording sheet employing a paper support, laminated on both sides with polyethylene, is specifically preferred in terms of recording images close to photographic image quality, while enabling low cost and high quality images to be obtained.

The polyethylene-laminated paper support will now be further detailed. Raw paper of the paper support is made of a wood pulp raw material and may optionally include a synthetic pulp such as polypropylene or synthetic fibers such as nylon or polyester. Preferred examples of the wood pulp include LBKP, LBSP, NBKP, NBSP, LDP, NDP, LUKP and NUKP. It is preferred to use, in large proportions, LBKP, NBSP, LBSP, NDP or LDP, each mainly having shorter fibers. The proportion of LBSP or LDP is preferably between 10% by weight and 70% by weight. The pulp is preferably chemical pulp, which has negrigible impurities (e.g., sulfate pulp, sulfite pulp). Pulp which is subjected to bleaching treatment to enhance whiteness, may also be employed.

To the raw paper, there may optionally be added a sizing agent such as a higher fatty acid or alkylketene dimer; a white pigment such as calcium carbonate, talc or titanium white; a paper-strengthening agent such as starch, polyacrylamide or polyvinyl alcohol; a fluorescent brightening agent; a moisture-holding agent such as polyethylene glycol; a dispersing agent; or a softening agent such as a quaternary ammonium salt.

Water freeness of the pulp used in paper-making is preferably 200 to 500 cc, based on CSF. The sum of the weight percentage of 24 mesh residue and the weight percentage of 42 mesh residue with respect to the fiber length, based on JIS-P-8207, is preferably between 30 and 70%. The 4 mesh residue is preferably not more than 20% by weight.

The weight of raw paper is preferably 30 to 250 g/m$^2$, and more preferably 50 to 200 g. The raw paper may be subjected to calender treatment, during or after the paper-making process, to provide enhanced smoothness. The density of raw paper is generally 0.7 to 1.2 g/m$^2$, based on JIS-P-8118. The rigidity of raw paper is preferably 20 to 200 g, based on JIS-P-8143. The surface of the raw paper may be coated with a sizing agent. As the sizing agent is employed one which is added into the interior of the raw paper, as described above. The pH of the raw paper is preferably 5 to 9 in the case when measured in the hot water extraction method.

As polyethylene, coated on the surface or the back of the raw paper, a low density polyethylene (LDPE) and/or a high density polyethylene (HDPE) are mainly used, however, other linear low density polyethylenes (LLDPE) or polypropylene may also be used. As widely used in the photographic art, a polyethylene layer coated on the side of an ink absorbing layer preferably contains, within the polyethylene, rutile type or anatase type titanium oxide to improve opacity or whiteness. The content of the titanium oxide is preferably 3 to 20% by weight, and more preferably 4 to 13% by weight. The polyethylene-coated paper can be employed as a glossy paper, or used through forming matte surface or silk surface, as obtained in conventional photographic print paper, by subjecting it to an embossing treatment when coating polyethylene on the raw paper surface by melt extrusion. The amount of polyethylene coated on the surface or the back of the raw paper is adjusted so that there is no curling when aged under high humidity or low humidity, after forming an ink absorbing layer and a backing layer. The thickness of polyethylene layer on the side of the ink absorbing layer is preferably 20 to 40 $\mu$m and that on the side of the backing layer is preferably 10 to 30 $\mu$m.

In the invention, a polyethylene-coated paper support having the following characteristics is preferably employed:

(1) Tensile strength; i.e., strength based on JIS-P-8113, 2 to 30 Kg in the longitudinal direction and 1 to 20 Kg in the cross direction, (2) Tear strength; 10 to 200 g in the longitudinal direction and 20 to 200 g in the cross direction, (3) Compression elastic modulus; 103 Kgf/cm$^2$ or more, and (4) Surface Beck smoothness; 20 sec. or longer under the conditions based on JIS-P-8119 in the case when used as glossy paper (provided that in the case of embossed paper, a shorter time may be allowed), and (5) Opacity; transmittance of visible light of 20% or less, preferably 15% or less, under the measuring conditions incidence of linear light and transmission of diffuse light.

The preferably employed coating methods include a roll coating method, a rod bar coating method, an air-knife coating method, a spray coating method, a curtain coating method and an extrusion coating method by the use of a hopper described in U.S. Pat. No. 2,681,294.

The water-based recording liquid used in the ink-jet recording using ink-jet recording sheets according to the invention will be further explained below. The water-based recording liquid is conventionally comprised of a water soluble dye, a solvent and if desired, other adjuvant(s). The water soluble dye may be such known dyes as used in the ink-jet recording, including a direct dye, an acid dye, a base dye, a reactive dye or a dye used in food processing. Of these preferred is the direct dye or acid dye. The solvent is mainly comprised of water. A high boiling solvent with a boiling point of 120° C. or higher, which is. liquid at room temperature, is further added to prevent the dye from precipitating when the recording liquid is dried, leading to clogging at the top of the nozzle or in the way of supplying the water-based recording liquid. Thus, the high boiling solvent needs to prevent precipitation of solid component(s) such as dye when water is evaporated, resulting in formation of coarse precipitates, so that the high boiling solvent must have a vapor pressure lower than that of water. It is also necessary that the high boiling solvent has a high miscibility with water. Examples of such high boiling solvents include alcohols, such as ethylene glycol, propylene glycol, diethylene glycol, triethylene glycol, glycerin, diethylene glycol monomethyl ether, diethylene glycol monobutyl ether, triethylene glycol monobutyl ether, glycerin monomethyl ether, 1,2,3-butanetriol, 1,2,4-butanetriol, 1,2,4-pentanetriol, 1,2,6-hexanetriol, thiodiglycol, triethanolamine and polyethylene glycol (at an average molecular weight of 300 or less). In addition, dimethylformamide and N-methylpyrrolidone may also be employed. Of these high boiling solvents preferably employed are a polyhydric alcohol such as diethylene glycol, triethanol amine, glycerin or triethanol amine; and a lower alkyl ether of a polyhydric alcohol, such as triethylene glycol monobutyl ether.

To the water-based recording liquid is optionally added an adjuvant, such as a pH-adjusting agent, a metal ion-sequestering agent, an anti-molding agent, a thickening agent, a surface tension adjusting agent, a wetting agent, a surfactant or an anticorrosive agent.

For the purpose of enhancing wettability with respect to the recording sheet and stabilizing ejection from the ink-jet nozzle, the surface tension of the water-based recording liquid is preferably 25 to 50 dyne/cm, and more preferably 28 to 40 dyne/cm at 25° C. The viscosity of the water-based recording liquid is preferably 2 to 10 Cp and more preferably 2.5 to 8 Cp at 25° C. The pH of the water-based recording liquid is preferably 3 to 9. When the volume of an ink droplet ejected from the ink nozzle is 1 to 30 pL, a dot size of 20 to 60 μm is preferably obtained. The ink droplet volume is more preferably 2 to 20 pL. A color print with such dot sizes provides high quality images.

With respect to at least magenta and cyan, in the case of ink-jet recording with a recording system using two kinds of water-based recording liquids, different in density by at least a factor of two, it becomes difficult to distinguish dots due to using an ink with a lower density. However, the present invention is applicable to such a recording system.

A variety of recording methods known in the art can be employed in the ink-jet recording method. Details thereof are described in "Trends in Ink-Jet Recording Techniques" (edited by Takaichi Nakamura and published by Nihon Kagakujoho Corp., Mar. 31, 1995).

EXAMPLES

Embodiments of the present invention will be explained based on examples, however, the present invention is not limited to these examples.

Example 1

A paper support coated with polyethylene on both sides of photographic raw paper at 160 g/m$^2$ was prepared, in which a polyethylene layer of a thickness of 34 μm and containing 13% by weight of an anatase type titanium dioxide was provided on the recording side, while on the back side was provided a polyethylene layer with a thickness of 25 μm and further provided thereon, was a backing layer containing 0.6 g/m$^2$ as a solid component of an acryl type resin with Tg of 65° C. and 0.3 g/m$^2$ of silica with an average particle size of 13 μm as a matting agent.

Next, to 900 ml of water was added, while stirred in a high-speed homogenizer, 180 g of fine silica particles, prepared in a gas phase method and having an average primary particle size of 7 nm, to form a silica aqueous dispersion. To the aqueous silica dispersion was added 120 ml of 20% aqueous solution of a cationic mordant described below, and dispersed for 30 min. in a high-speed homogenizer to obtain a pale clear dispersion. Next, there was gradually added 400 ml of a 5% aqueous solution of polyvinyl alcohol (containing 4% by weight of ethyl acetate) further having a polymerization degree of 3,500 and a saponification degree of 88%. Subsequently, a 5% aqueous solution of boric acid (containing 20% ethanol), as a hardening agent was added thereto in amounts as shown in Table 3, then, 50 ml of aqueous gelatin solution was added and water was further added to make a total volume of 2,100 ml. Thus, a coating solution to form a void layer was prepared.

Cationic mordant:

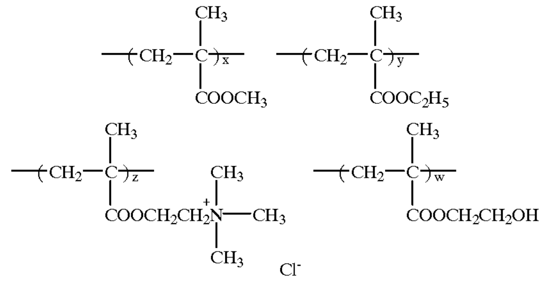

x:y:z:w = 25:25:45:5 (molar ratio)
Average molecular weight ≈ 23,000

The thus prepared coating solution was heated to 40° C., coated on the recording side of the polyethylene-coated paper support described above to form a wet layer thickness of 220 μm, cooled to a coating layer temperature of 15° C. or lower (for 20 sec.), subsequently, dried by successively blowing air at 25° C. for 60 sec, air at 30° C. for 60 sec., air at 40° C. for 60 sec., air at 45° C. for 120 sec. and air at 35° C. for 60 sec and subsequently passed through an atmosphere of 25° C. and 50% R.H. for 120 sec. Recording sheets 1 to 5 were thus prepared.

Further, recording sheets 6 to 10, 11 to 15, and 16 to 20 each were prepared in the same manner as in the recording sheets 1 to 5, except that the amount of 5% aqueous solution of polyvinyl alcohol having a polymerization degree of 3,500 and a saponification degree of 88% was varied to 500 ml, 600 ml and 800 ml, respectively. Recording sheets 1 to 20 thus obtained were aged at 35° C. for a period of 3 days.

Next, water-based ink-jet recording liquids were prepared as follows.

| | | |
|---|---|---|
| Yellow ink-1 | | |
| Direct Yellow 86 | 2.0 | g |
| Diethylene glycol | 22.2 | g |
| Glycerin | 4.5 | g |
| Water to make | 100 | ml |
| Magenta ink-1 | | |
| Direct Red 227 | 1.8 | g |
| Glycerin | 3.5 | g |
| Diethylene glycol monobutyl ether | 21.5 | g |
| Water to make | 100 | ml |
| Cyan ink-1 | | |
| Direct blue 199 | 2.4 | g |
| Ethylene glycol | 16.1 | g |
| Glycerin | 9.5 | g |
| Water to make | 100 | ml |

The amount of a hydroxy group per 100 ml of each of the above water-based ink-jet recording liquids were as follows.

Yellow ink-1: 566 mmol/100 ml

Magenta ink-1: 247 mmol/100 ml

Cyan ink-1: 829 mmol/100 ml

Next, using these ink-jet recording liquids, printing was carried out on each of recording sheets 1 through 20, by an on-demand type ink-jet printer (droplet volume=25pL, maximum printing density=720dpi×720dpi). Printing was carried out for a single-colored solid printing, two-colored solid printing and three-colored solid printing. The single-colored solid image was printed at the maximum printing density (at an ink amount=20 ml/m$^2$), the two-colored solid image was printed at 60% of the maximum printing density (atan ink amount=24 ml/m$^2$), and the three-colored solid image was printed at 40% of the maximum printing density (at an ink amount=24 ml/m$^2$), in which the amount of the hydroxy group contained in the high boiling solvent in each of the solid density portions (expressed in mmol/m$^2$) was as follows.

TABLE 2

| Single-colored solid printing | | | Two-colored solid printing | | | Three-colored solid printing |
|---|---|---|---|---|---|---|
| Y | M | C | Y + M | M + C | C + M | Y + M + C |
| 113 | 49 | 166 | 98 | 129 | 167 | 131 |

From Table 2, the Z of the water-based recording liquid when printed under the conditions described above [i.e., a maximum value of the amounts of the hydroxy group contained in a high boiling organic solvent, per unit area when recorded on a recording sheet at the maximum ejecting amount of the water-based recording liquid (maximum ink amount)] is 167 mmol/m$^2$.

Printed recording sheets 1 to 20 were allowed to stand in an atmosphere at 40° C. and 80% R.H. for 2 days. After storage, recording sheet samples each were observed with a magnifier for cracking, and single-colored solid printing portions (Y, M, C), two-colored solid printing portions (Y+M, M+C, C+Y) and three-colored solid printed portions (Y+M+C) were evaluated with respect to cracking after storage, based on the following criteria.

A: No cracking was observed even with a magnifier.

B: Slight cracking was observed with a magnifier, but was not visually evident.

C: Slight racking was observed with a magnifier.

D: Marked cracking was visually observed.

Results are shown in Table 3.

TABLE 3

| Recording | Boric acid | | PVA | | | Cracking after storage | | | | | | |
|---|---|---|---|---|---|---|---|---|---|---|---|---|
| sheet | ml | X-value | Y-value | X/Y | Z/Y | Y | M | C | Y + M | M + C | C + Y | Y + M + C |
| 1(Comp.) | 30 | 2.5 | 37.6 | 0.066 | 4.44 | C | B | D | B | C | D | C |
| 2(Comp.) | 60 | 5.1 | 37.6 | 0.136 | 4.44 | B | A | D | A | B | D | B |
| 3(Comp.) | 90 | 7.6 | 37.6 | 0.202 | 4.44 | B | A | D | A | B | D | B |
| 4(Comp.) | 150 | 12.7 | 37.6 | 0.338 | 4.44 | B | B | D | B | B | D | B |
| 5(Comp.) | 300 | 25.3 | 37.6 | 0.672 | 4.44 | C | B | D | D | C | D | C |
| 6(Inv.) | 30 | 2.5 | 47.0 | 0.053 | 3.55 | C | B | C | A | B | C | B |
| 7(Inv.) | 60 | 5.1 | 47.0 | 0.109 | 3.55 | A | A | B | A | A | B | A |
| 8(Inv.) | 90 | 7.6 | 47.0 | 0.162 | 3.55 | A | A | B | A | A | B | A |
| 9(Inv.) | 150 | 12.7 | 47.0 | 0.270 | 3.55 | A | A | B | A | A | B | A |
| 10(Comp.) | 300 | 25.3 | 47.0 | 0.538 | 3.55 | B | A | D | C | B | D | B |
| 11(Comp.) | 30 | 2.5 | 56.4 | 0.044 | 2.98 | C | B | D | C | B | D | B |
| 12(Inv.) | 60 | 5.1 | 56.4 | 0.091 | 2.98 | B | A | B | B | B | B | B |
| 13(Inv.) | 90 | 7.6 | 56.4 | 0.136 | 2.98 | A | A | A | A | A | A | A |
| 14(Inv.) | 150 | 12.7 | 56.4 | 0.226 | 2.98 | A | A | A | A | A | A | A |
| 15(Inv.) | 300 | 25.3 | 56.4 | 0.452 | 2.98 | A | A | B | A | A | B | A |
| 16(Comp.) | 30 | 2.5 | 75.2 | 0.033 | 2.23 | C | B | D | B | B | D | B |
| 17(Inv.) | 60 | 5.1 | 75.2 | 0.068 | 2.23 | A | A | B | A | A | B | A |
| 18(Inv.) | 90 | 7.6 | 75.2 | 0.101 | 2.23 | A | A | A | A | A | A | A |
| 19(Inv.) | 150 | 12.7 | 75.2 | 0.169 | 2.23 | A | A | A | A | A | A | A |
| 20(Inv.) | 300 | 25.3 | 75.2 | 0.337 | 2.23 | A | A | A | A | A | A | A |

As can be seen from Table 3, in cases when requirements (1) and (2) according to the invention are met, no cracking occurred in the solid density portions even after storage at high temperature and high humidity. Specifically, it was proved that when X/Y was between 0.1 and 0.4, and Z/Y was 3 or less, cracking was the least prominent.

Example 2

Water-based ink-jet recording liquids were prepared as below.

| Yellow ink-2 | |
|---|---|
| Direct Yellow 86 | 2.0 g |
| Diethylene glycol | 21.5 g |
| Glycerin | 9.8 g |
| Water to make | 100 ml |

-continued

| Magenta ink-2 | |
|---|---|
| Direct Red 227 | 1.8 g |
| Glycerin | 10.5 g |
| Diethylene glycol | 19.5 g |
| Water to make | 100 ml |
| Cyan ink-2 | |
| Direct blue 199 | 2.4 g |
| Ethylene glycol | 16.1 g |
| Glycerin | 12.9 g |
| Water to make | 100 ml |

The amount of a hydroxy group per 100 ml of each of the above water-based ink-jet recording liquids were as follows.

Yellow ink-1: 725 mmol/100 ml

Magenta ink-1: 710 mmol/100 ml

Cyan ink-1: 940 mmol/100 ml

Using the on-demand type ink-jet printer used in Example 1, a single-colored solid print, two-colored solid print and three-colored solid print were respectively made, in which the amount of the hydroxy group contained in a high boiling solvent in each of the solid density portions (expressed in mmol/$m^2$) is as follows.

TABLE 4

| Single-colored solid printing | | | Two-colored solid printing | | | Three-colored solid printing |
|---|---|---|---|---|---|---|
| Y | M | C | Y + M | M + C | C + M | Y + M + C |
| 145 | 142 | 188 | 172 | 198 | 200 | 190 |

From Table 4, the Z of the water-based recording liquid when printed under the conditions described above [i.e., a maximum value of the amounts of the hydroxy group contained in a high boiling organic solvent, per unit area when recorded on a recording sheet at the maximum ejecting amount of the water-based recording liquid (or maximum ink amount)] is 200 mmol/$m^2$. Then, similarly to e-Example 1, printed recording sheets 1 through 20 were evaluated with respect to cracking. Results are shown in Table 5.

TABLE 5

| Recording | Boric acid | | PVA | | | Cracking after storage | | | | | | |
|---|---|---|---|---|---|---|---|---|---|---|---|---|
| sheet | ml | X-value | Y-value | X/Y | Z/Y | Y | M | C | Y + M | M + C | C + Y | Y + M + C |
| 1(Comp.) | 30 | 2.5 | 37.6 | 0.066 | 5.32 | D | D | D | D | D | D | D |
| 2(Comp.) | 60 | 5.1 | 37.6 | 0.136 | 5.32 | C | C | D | D | D | D | D |
| 3(Comp.) | 90 | 7.6 | 37.6 | 0.202 | 5.32 | C | C | D | D | D | D | D |
| 4(Comp.) | 150 | 12.7 | 37.6 | 0.338 | 5.32 | B | B | D | D | D | D | D |
| 5(Comp.) | 300 | 25.3 | 37.6 | 0.672 | 5.32 | C | C | D | D | D | D | D |
| 6(Inv.) | 30 | 2.5 | 47.0 | 0.053 | 4.25 | D | D | D | D | D | D | D |
| 7(Inv.) | 60 | 5.1 | 47.0 | 0.109 | 4.25 | B | B | D | D | D | D | D |
| 8(Inv.) | 90 | 7.6 | 47.0 | 0.162 | 4.25 | B | B | C | C | D | D | D |
| 9(Inv.) | 150 | 12.7 | 47.0 | 0.270 | 4.25 | B | B | C | C | D | D | D |
| 10(Comp.) | 300 | 25.3 | 47.0 | 0.538 | 4.25 | C | C | D | D | D | D | D |
| 11(Comp.) | 30 | 2.5 | 56.4 | 0.044 | 3.55 | D | D | D | D | D | D | D |
| 12(Inv.) | 60 | 5.1 | 56.4 | 0.091 | 3.55 | B | B | B | B | B | B | B |
| 13(Inv.) | 90 | 7.6 | 56.4 | 0.136 | 3.55 | A | A | B | B | B | B | B |
| 14(Inv.) | 150 | 12.7 | 56.4 | 0.226 | 3.55 | A | A | B | B | B | B | B |
| 15(Inv.) | 300 | 25.3 | 56.4 | 0.452 | 3.55 | B | B | B | B | B | B | B |
| 16(Comp.) | 30 | 2.5 | 75.2 | 0.033 | 2.67 | D | D | D | D | D | D | D |
| 17(Inv.) | 60 | 5.1 | 75.2 | 0.068 | 2.67 | A | A | B | B | B | B | B |
| 18(Inv.) | 90 | 7.6 | 75.2 | 0.101 | 2.67 | A | A | A | A | A | A | A |
| 19(Inv.) | 150 | 12.7 | 75.2 | 0.169 | 2.67 | A | A | A | A | A | A | A |
| 20(Inv.) | 300 | 25.3 | 75.2 | 0.337 | 2.67 | A | A | A | A | A | A | A |

As can be seen from Table 5, in cases when requirements (1) and (2) according to the invention are met, no cracking occurred in the solid density portions even after storage at high temperature and high humidity.

What is claimed is:

1. An ink-jet recording method comprising:

recording on an ink-jet recording sheet comprising a non-water-absorbing support and provided thereon an ink absorbing layer containing polyvinyl alcohol, fine inorganic particles and boric acid or its salt, using an ink-jet recording apparatus and a water-based recording liquid containing a high boiling solvent containing a hydroxy group, wherein the following requirements (1) and (2) are met:

$$0.05 \leq X/Y \leq 0.5 \quad (1)$$

$$Z/Y \leq 4 \quad (2)$$

wherein X is an amount of boric acid or its salt contained in the ink absorbing layer of the recording sheet, expressed in mmol/$m^2$; Y is an amount of a hydroxy group contained in polyvinyl alcohol contained in the ink absorbing layer of the recording sheet, expressed in mmol/$m^2$; and Z is a maximum amount of the hydroxy group contained in the high boiling solvent contained in a unit area when recorded on the recording sheet at a maximum ejecting amount of the water-based recording liquid, expressed in mmol/$m^2$.

2. The ink-jet recording method of claim 1, wherein the following requirements (1) and (2) are met:

$$0.1 \leqq X/Y \leqq 0.4 \quad (1)$$

$$Z/Y \leqq 3 \quad (2)$$

wherein X, Y and Z are the same as defined in claim 1.

3. The ink-jet recording method of claim 1, wherein said polyvinyl alcohol has an average polymerization degree of 2,000 to 5,000.

4. The ink-jet recording method of claim 1, wherein said fine inorganic particles are fine silica particles which are prepared in a gas phase method.

5. The ink-jet recording method of claim 1, wherein said fine inorganic particles have an average primary particle size of 3 to 30 nm.

6. The ink-jet recording method of claim 1, wherein a ratio by weight of said fine inorganic particles to said polyvinyl alcohol is between 3 and 9.

7. The ink-jet recording method of claim 1, wherein said support is a paper support laminated on both sides with polyethylene.

8. The ink-jet recording method of claim 1, wherein the volume of an ink droplet ejected from an ink nozzle of the ink-jet recording apparatus is 1 to 30 pL.

9. The ink-jet recording method of claim 1, wherein said polyvinyl alcohol has an average polymerization degree 2,000 to 5,000;

said fine inorganic particles have an average primary particle size of 3 to 30 nm; and a ratio by weight of said fine inorganic particles to said vinyl alcohol is between 3 and 9.

10. The ink-jet recording method of claim 9, wherein the owing requirements (1) and (2) are met:

$$0.1 \leqq X/Y \leqq 0.4 \quad (1)$$

$$Z/Y \leqq 3. \quad (2)$$

* * * * *